United States Patent
Christensen

[11] 4,101,199
[45] Jul. 18, 1978

[54] RADIATION BEAM SPLITTER

[75] Inventor: Craig M. Christensen, Atherton, Calif.

[73] Assignee: Noctua, Inc., Belmont, Calif.

[21] Appl. No.: 761,833

[22] Filed: Jan. 24, 1977

Related U.S. Application Data

[62] Division of Ser. No. 621,709, Oct. 14, 1975, Pat. No. 4,036,557.

[51] Int. Cl.² .................. G02B 27/28; G02B 27/10
[52] U.S. Cl. .................................. 350/152; 350/173; 350/286
[58] Field of Search ............... 350/152, 172, 173, 286

[56] References Cited
U.S. PATENT DOCUMENTS

| | | | |
|---|---|---|---|
| 3,560,082 | 2/1971 | Burch et al. | 350/286 |
| 3,984,153 | 10/1976 | Zanoni | 350/152 |

FOREIGN PATENT DOCUMENTS 11,556 of 1899 United Kingdom ............ 350/286

Primary Examiner—John K. Corbin
Assistant Examiner—Wm. H. Punter
Attorney, Agent, or Firm—Townsend and Townsend

[57] ABSTRACT

A unique two component beam splitter for generating multiple pairs of parallel beams of coherent radiation from input beams, one pair from each input radiation beam from a given laser source. The input beam from each different source is incident to a different input face of the beam splitter and the polarization states of each beam in a given pair are related in a unique manner.

Each incident radiation input beam is separated by means of a selectively transmissive coating on one of the roof faces of an Amici prism into a first beam comprising substantially all of the polarized component parallel to the plane of incidence (P polarization) and one-half of the polarization component normal to the plane of incidence (S polarization), and a second beam comprising one-half of the S polarization component alone.

6 Claims, 7 Drawing Figures

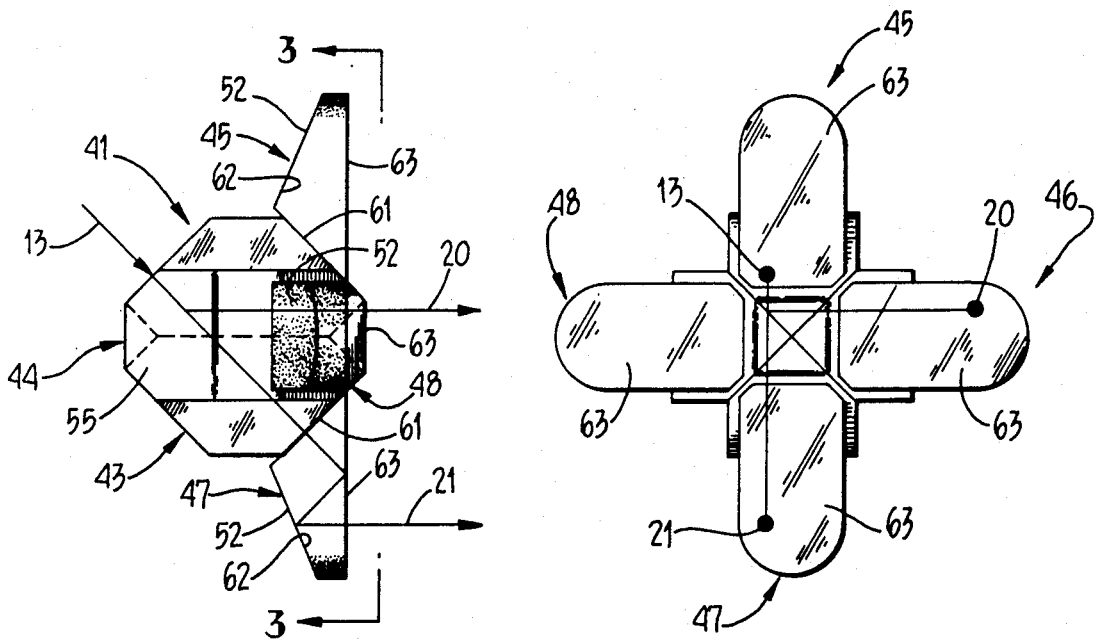
Fig_2  Fig_3
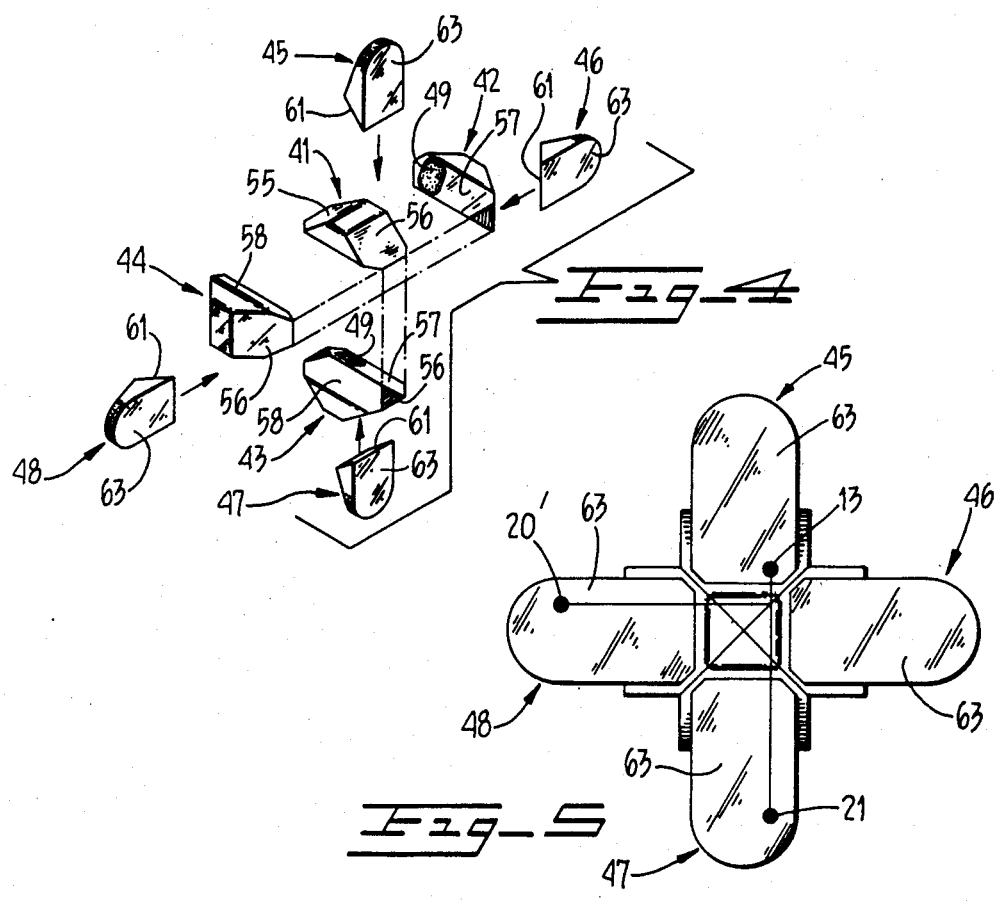
Fig_4
Fig_5

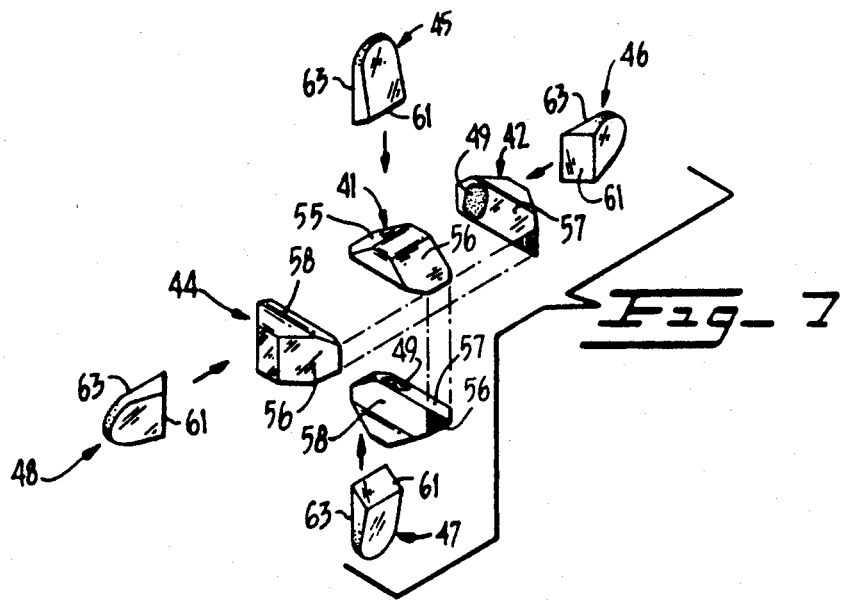

RADIATION BEAM SPLITTER

CROSS REFERENCE TO RELATED APPLICATION

This application is a divisional of co-pending U.S. Pat. application Ser. No. 621,709 filed Oct. 14, 1975 for LASER DOPPLER VELOCIMETER now U.S. Pat. No. 4,036,557.

BACKGROUND OF THE INVENTION

This invention relates to an apparatus for measuring the velocity of moving material, e.g. gaseous, liquid or solid substances. More particularly, this invention relates to an apparatus employing the laser doppler effect for measuring the velocity of moving media.

Laser velocimeters are known which employ the doppler effect to measure the velocity of moving fluid at a measuring point. Such laser doppler velocimeters have the potential advantage over known mechanical devices for velocity component measurements of permitting such measurements without significantly disturbing the flow characteristics of the fluid being measured. Other advantages of laser velocimeters over mechanical devices are the relatively high speed of the measurement process and the ability of such devices to perform measurements in relatively inaccessible locations.

Although laser velocimeters using pulsed laser sources have been suggested in the literature, known laser velocimeters typically employ a continuous wave laser source. The coherence length of the light generator in such a source is selected to be relatively long, e.g. of the order of several centimeters or more, in order to eliminate the requirement of exact path length equality of two related wavefronts from source to point of optical interference. In such systems, the use of a short coherence length continuous wave or pulsed laser, e.g. an injection laser diode, is precluded due to the fact that interference of beams from such a source cannot be predictably achieved due to the lack of substantially equal path lengths for related beams. Other limitations inherent in known continuous wave laser velocimeters are the relatively large physical size necessitated by the relatively large lasers and associated optics employed, and their relative instability in use, which necessitates frequent readjustment using relatively sophisticated alignment techiques.

SUMMARY OF THE INVENTION

The invention comprises a unique two component beam splitter for use in a pulsed laser velocimeter or a similar environment. In the preferred embodiment four Amici roof prisms and four reflecting prisms provide multiple pairs of parallel beams, one pair from each radiation beam incident to a different input face of the beam splitter, with the polarization states of each beam in a pair being related in a unique manner. Each input beam is supplied by an injection laser diode operated in a pulsed mode.

Each Amici roof prism is provided with an optical coating over a portion of one of the roof faces. This coating, which preferably comprises a single layer of titanium dioxide, transmits substantially all of the polarized component parallel to the plane of incidence (P polarization) and equally divides the polarization component normal to the plane of incidence (S polarization).

The unique design of the two component beam splitter permits exact parallel alignment of emerging beams with respect to an optical axis, relative angular orientation between the planes defined by different emergent beam pairs resulting from incident laser beams incident to different input faces of the Amici prisms, and path length equality for each emerging beam pair resulting from a laser beam input at any input face, all by simple translations and rotations of the Amici prisms and their associated reflecting prisms. In addition, alignment of each of the laser diode sources relative to the two component beam splitter is simply achieved by manipulating the laser and observing that position at which the associated beam pairs intersect after passing through an associated focusing lens. Since there is only one possible intersection point located on the optical axis of the beam splitter at the focus of the focusing lens, all pairs of intersecting beams automatically intersect at the same measuring point. Moreover, after alignment of each laser diode relative to the two component beam splitter, small off-axis movements of the focusing lens with respect to the beam splitter do not alter the angle of intersection between associated beam pairs and do not disrupt the actual intersection of the beams.

The lateral spacing of the emergent beam pairs, and thus the angle of intersection thereof at the measuring point, may be preselected as one of two values by simply securing the associated reflecting prism to a different end face of the associated Amici prism, and using the opposite end face of the Amici prism as the radiation input face.

For a fuller understanding of the nature and advantages of the invention, reference should be had to the ensuing detailed description taken in conjunction with the accompanying drawings.

BRIEF DESCRIPTION OF THE DRAWINGS

FIG. 2 is an enlarged side elevation view showing the assembled two component beam splitter invention;

FIG. 3 is an end elevation view of the two component beam splitter of FIG. 2;

FIG. 4 is an exploded view illustrating the individual optical elements comprising the two component beam splitter;

FIG. 5 is an end elevation view similar to FIG. 3 showing alternate beam generation;

FIG. 7 is an exploded view similar to FIG. 4 and illustrating an alternate embodiment of the invention.

DESCRIPTION OF THE PREFERRED EMBODIMENT

Figure 1:
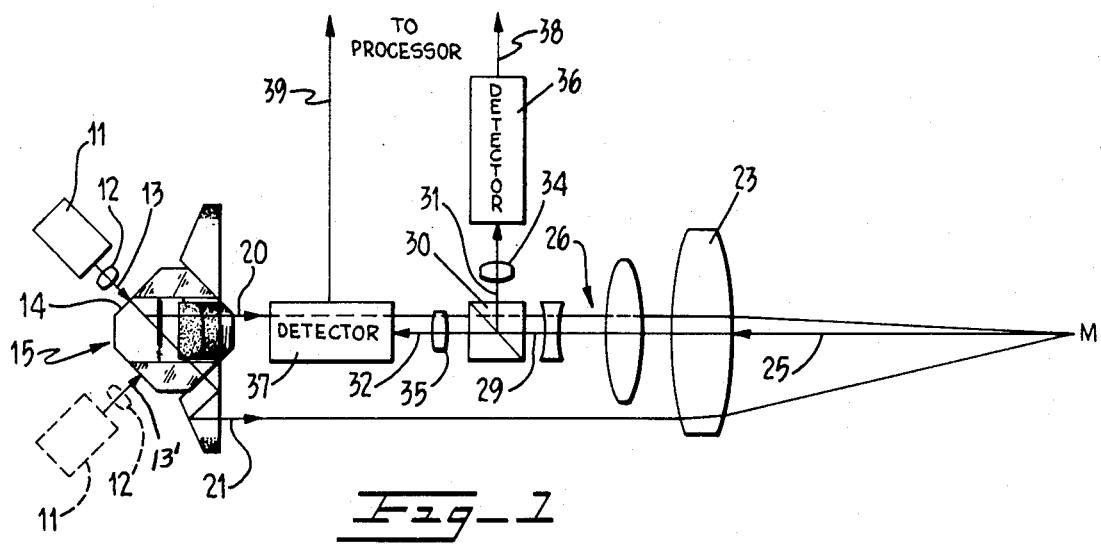
FIG. 1 is a schematic diagram illustrating a laser doppler velocimeter incorporating the invention.

Turning now to the drawings, FIG. 1 illustrates a laser doppler velocimeter incorporating a two component beam splitter constructed according to the invention. As seen in this Fig., pulsed coherent light from a laser source 11 is collected by a collimating lens 12 and directed onto an input face 14 of the two-component beam splitter generally designated by reference 15 and illustrated in FIGS. 2-5. Pulsed laser source 11 is preferably an injection laser diode, e.g. a type SG 2007 laser diode available from RCA Corporation. Collimating lens 12 is preferably a cemented doublet which is diffraction limited over a field angle containing the laser diode emitting region.

Two component beam splitter 15 divides the incident light beam 13 into a pair of parallel beams 20, 21 which travel directly to a focusing lens 23 which focuses beams 20, 21 to a measuring point M located on the optical axis of the system at the focus of lens 23. Focusing lens 23 is preferably an air spaced triplet which is diffraction limited over the beam regions. Measuring point M is located in the path of a material, e.g. a gas, liquid or solid, whose velocity is to be measured, so that the back reflected light represented by a single ray 25 contains the doppler differential frequency information in optical form. The back reflected light is collected and collimated by focusing lens 23, compressed in diameter by a two element beam compressing lens assembly generally designated by reference numeral 26 (which may comprise a pair of air spaced triplets), and directed onto the input face of a detector beam splitter 30.

The compressed beam 29 is separated into two beams of orthogonal polarization by a detector beam splitter 30, which preferably comprises two 45° prisms, one of which is provided with a dielectric polarizing beam splitter coating on the diagonal face, the prisms being cemented together at their mutual diagonal interfaces with optical cement. Beams 31, 32 are imaged by a pair of detector lenses 34, 35, which may comprise air spaced triplets, onto the light input of a pair of light sensitive detectors 36, 37. Detectors 36, 37 preferably comprise conventional avalanche photodiode detectors such as two type TIXL 69 detectors sold by Texas Instruments, Inc. Although beam 31 and the optical axis of lens 34 are illustrated as lying in the plane of the paper in FIG. 1, it should be noted that this representation is for convenience only. In actuality, beam splitter 30, lens 34 and detector 36 are all positioned at a different rotational angle about the optical axis of the system of FIG. 1 so that beam 31 emerges at an angle to the plane of the paper, e.g. ±45°.

Figure 6:
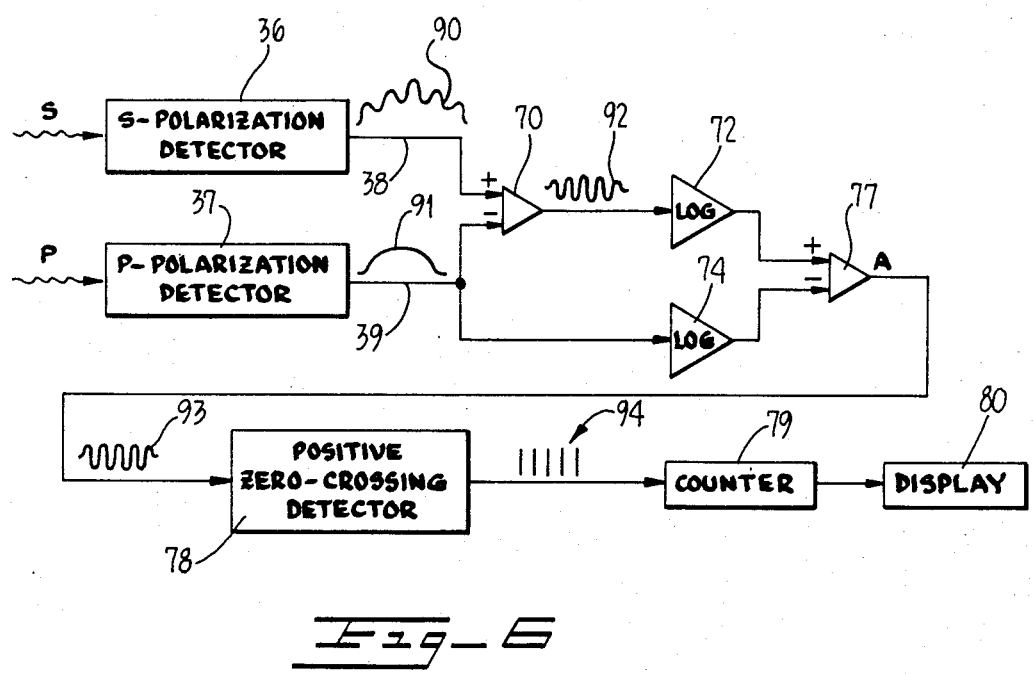
FIG. 6 is a block diagram of an electronic signal processing unit.

The electrical output signals on terminals 38, 39 of detectors 36, 37 are coupled to the electronic signal processing system shown in FIG. 6 and described below for interpreting the differential frequency information and determining the velocity of the medium at measuring point M.

With reference to FIGS. 2-4, two component beam splitter 15 is comprised of two prism types: viz. four Amici prisms 41-44 and four reflecting prisms 45-48 each in contact with a different one of Amici prisms 41-44, respectively. As illustrated for Amici prisms 42 and 43, one of the roof faces 57 of each Amici prism 41-44 is provided with a beam splitting coating 49 responsive to incident monchromatic light for transmitting substantially all of the P polarization component of the light therethrough while splitting substantially equally the S polarization component of the incident light. Coating 49 preferably comprises a single layer of titanium dioxide; however, other equivalent coating materials known to those skilled in the art may be employed.

Each of the reflecting prisms 45-48 is provided with a conventional metallic reflecting coating 52 on the rear surface 62 thereof having a high reflectivity coefficient.

Each Amici prism has a pair of end faces 55, 56, either of which may serve as the light input or light output face as described more fully below, and a pair of roof faces 57, 58, to the former of which the coating 49 is applied.

The eight optical elements 41-48 comprising the two component beam splitter 15 are permanently secured together after the alignment procedure described below by means of conventional optical cement which is transparent to monochromatic light of the wave length produced by injection laser diode 11. Preferably an ultraviolet setting cement such as Summers Laboratories, Inc. type UV71 is used; however, other equivalent cement may be employed, as desired.

FIG. 3 illustrates the relative position of emergent beams 20, 21 resulting from an incident input beam 13 to input face 55 of Amici prism 41 of the two component beam splitter assembly 15 in the preferred mode of operation. As seen in this Fig., beam 20 emerges from surface 63 of reflecting prism 46, while beam 21 emerges from surface 63 of reflecting prism 47. The paths of the rays through the two component beam splitter assembly are as follows. Beam 13 enters Amici prism 41 substantially normal to surface 55 in the region overlying the coated surface 49, strikes coated surface 49 and is split into a first reflected beam comprising one half of the S polarization component and a second transmitted beam comprising the remaining one half of the S polarization component and the entire P polarization component of the incident beam 13. The reflected beam exits Amici prism 41 via uncoated roof face 58, enters Amici prism 42 via roof face 57 and exits via end face 56. The beam exiting from end face 56 enters reflecting prism 46 via face 61, is totally internally reflected at face 63, is reflected by face 62 and exits via face 63 as beam 20. The transmitted beam enters Amici prism 43 via uncoated roof face 58, exits via face 56, enters reflecting prism 47 via input face 61, is totally internally reflected at exit face 63, is reflected at face 62 and emerges as beam 21 from face 63.

FIG. 5 illustrates the relative position of emergent beams 20', 21 resulting from an incident input beam 13 to a different portion of input face 55 of Amici prism 41. As seen in this Fig., beam 20' emerges from surface 63 of reflecting prism 48, while beam 21 emerges from surface 63 of reflecting prism 47 as above. The alternative paths of the rays through the two component beam splitter assembly 15 are as follows. Beam 13 enters Amici prism 41 substantially normal to surface 55 in the region overlying coated surface 49 of Amici prism 43 and exits via roof 58. The exiting beam strikes coated surface 49 of Amici prism 42 and is split into a first reflected beam comprising one-half of the S polarization component and a second transmitted beam comprising the remaining one-half of the S polarization component and the entire P polarization component of the incident beam 13. The reflected beam enters Amici prism 44 via roof face 58 and exits via end face 56. The beam exiting from end face 56 enters reflecting prism 48 via face 61, is totally internally reflected at face 63, is reflected by face 62 and exits via face 63 as beam 20'. The transmitted beam enters Amici prism 42 via roof face 57, exits via face 58, enters Amici prism 43 via the uncoated portion of roof face 57, and exits from Amici prism 43 via face 56. The exiting beam from Amici prism 43 enters reflecting prism 47 via input face 61, is totally internally reflected at exit face 63, is reflected at face 62 and emerges as beam 21 from face 63. It should be noted that, with either the FIG. 3 or the FIG. 5 arrangement, the emergent beam pair 20 (20'), 21 lies in a plane which is offset from the geometrical axis of the beam splitter assembly 15.

Although only one pulsed laser source 11 is illustrated in full line in FIG. 1, and only one input beam 13 is shown in FIGS. 1 and 2, in practice four laser sources 11 are employed, with each such additional laser source 11 and associated collimating lens 12 being arranged adjacent the input face 55 of a different Amici prism 42-44. One such additional pulsed laser source 11 is illustrated in broken lines in FIG. 1 with the associated collimating lens 12, both elements being positioned to direct a beam 13' toward input face 55 of Amici prism 43.

In operation, the plurality of laser sources 11 are sequentially operated to serially generate different resulting beam pairs. Due to the symmetry of the two component beam splitter 15 about the geometrical axis thereof, the path of the other input beams and the resulting two component beams through the various elements 41-48 of the assembly 15 when an input beam is incident on the input face 55 of a different Amici prism will be apparent to those skilled in the art. Each emergent beam pair is focused by the same lens 23 onto the measuring point M. Each pair of beams permits measurement of a component of velocity of the material being measured along a line formed by the intersection of the beam pair plane and a plane normal to the axis of the beam splitter 15 and passing through the measuring point M. Thus, two beam pairs provide a measurement of two components of velocity in the latter plane. The relative orientation of the two components may be spatially adjusted in the manner described below. It is noted that there are four possible beam pairs which may be generated, each pair resulting from the beam incident to the light input face of a different Amici prism 41-44.

As illustrated in the Figs., face 55 of each of the Amici prisms 41-44 serves as the light input face, while reflecting prisms 45-48 are cemented to face 56 of these elements. With this configuration, the linear separation distance between the emergent beam pairs, e.g. beams 20, 21, can be adjusted over a first range of values in the manner described below. If a different range of values of smaller magnitude is desired in a given application, the linear beam spacing may be narrowed by cementing reflecting prisms 45-48 onto faces 55 of prisms 41-44, as shown in FIG. 7, and faces 56 of these latter elements may serve as the light input face. Since the diameter of an imaginary circle through which the emerging beam pair center lines pass is identical in this alternate configuration, optical elements 23, 26, 30, 34, and 35 need not be altered. As will be appreciated by those skilled in the art, the angle of intersection of beams 20, 21 at measuring point M determines the magnitude of the doppler frequency for a given velocity at M.

In general, the greater the angle between the convergent beams, the smaller the fringe spacing, and the smaller the fringe spacing, the higher the doppler frequency for a given velocity of the material at the measuring point M. Thus, the velocimeter can be tailored to two different velocity ranges by simply reversing the arrangement of the beam splitter assembly 15 components.

The beam splitter assembly 15 is adjusted during assembly in the following manner. In order to insure exact parallelism of an emergent beam pair, e.g. beams 20, 21, to the optical axis of the beam splitter assembly 15, the input beam 13 is directed onto the input face and the appropriate pair of reflecting prisms 45-48 are rotated about an axis normal to the exit face 56 of the associated Amici prism until the beams are parallel. This step is repeated for each laser source 11 and each pair of reflecting prisms from the faces 63 of which the associated beams comprising a given beam pair emerge. Once all reflecting prisms 45-48 are fixed, there is only one angular orientation of each laser relative to the associated light input face 55 for which the emerging beams are parallel.

Next, relative angular orientation between planes defined by respective pairs of emergent beams, each resulting from an input beam at a different one of the Amici prism input faces 55, is achieved by translating the individual reflecting prisms 45-48 along the respective contact faces 56 of the associated Amici prisms 41-44.

Thereafter, the path lengths of respective beam pairs from an input at any given Amici prism face 55 are equalized by translating each Amici prism 41-44 and its associated reflecting prism 45-48 with respect to the remaining Amici and reflecting prisms along the beam splitter optical axis.

Once the above adjustments have been made, the beam splitter assembly 15 is mounted in a housing (not shown) together with focusing lens 23 and elements 26, 34 and 35. In the preferred embodiment, utilizing laser injection diode sources 11, the housing comprises a cylindrical member having a diameter of about four inches and an axial length of about ten inches. Thereafter, the individual lasers 11 are aligned with respect to the beam splitter assembly by arranging the beam from a given laser 11 normal to the associated Amici prism light input face, preferably by autocollimating the beam, and repositioning the laser 11 to vary the incident beam angle until the resulting beam pair intersects after passing through focusing lens 23. It is noted that the only possible point of exact intersection of a pair of beams is precisely at the focus of focusing lens 23. Thus, once the beam splitter is correctly assembled each pair of intersecting beams automatically intersects at the same measuring point M. Moreover, once laser sources 11 are all aligned with respect to the beam splitter assembly 15, small relative movements of the focusing lens 23 off the geometrical axis of the assembly do not affect either the fact of intersection of all beams or the angle at which the beam pairs intersect, but merely the spatial location of measuring point M. While movements of up to ten times the blur diameter of lens 23 may be tolerated, preferably any such movements should be confined to a magnitude no greater than the blur diameter of lens 23. In one such lens 23 incorporated in a working embodiment of the velocimeter, the worst case blur diameter is 0.020 inch. This arrangement provides the advantage that slight misalignment of focusing lens 23 does not adversely affect the operation by the invention.

A key feature of the velocimeter is the manner in which the image of the laser source 11 is reflected in passing through the beam splitter assembly 15. It is known that the emitting region of many laser sources, such as an injection laser diode, is essentially a line segment, which may be defined as an emitting region having a length to width ratio on the order of 100 or more. It has been found experimentally that reversing the image of a line segment emitting region about the longitudinal axis of the line segment when producing a pair of beams does not impair the capacity of the two images in the beams to interfere optically when superimposed. However, reversing the images about any other axis destroys coherence btween superimposed images due to the fact that light radiation from one end of the line segment is substantially incoherent with respect to the light radiation from the other end of the same line segment. Thus, when an image reversed about any other axis than the longitudinal axis of that line segment is superimposed on the original image, coherent optical interference does not result.

This problem has been solved in the velocimeter by insuring that each image pair of the laser source formed at the measuring point M comprises a pair of mirror images, i.e. one image is reversed about the longitudinal axis of the laser emitting region, and by subjecting the two emerging beams to the same number of turnings by reflection about the other two axes.

An important aspect of the velocimeter is the manner in which the differential doppler frequency information is isolated from the superimposed non-doppler noise information in back-reflected beam 25. As noted above, coating 49 on surfaces 57 of the Amici prisms 41-44 transmits substantially all of the P component of polarization therethrough while splitting equally the S polarization component of the incident beam. The emergent beam 21 thus contains all of the P polarization component and one half of the S polarization component of the input beam 13, while beam 20 comprises the remaining half of the polarization component of the input beam 13. Both beams 20, 21 are intensity modulated with time in accordance with any fluctuations in the output of laser source 11. When beams 20, 21 intersect at measuring point M only the common S components thereof interfere to produce the differential frequency shift, i.e. the doppler differential frequency information, since only identical polarization states can interfere. After reflection at point M, the S polarization component of the reflected beam represented by ray 25 contains the doppler differential frequency information superimposed on the intensity modulation due to the source 11 fluctuations and also variations in the scattering capability of the medium under measurement, while the P polarization component contains only the intensity modulation information. This modulation information is normally considered to be background noise which masks the doppler differential frequency information and does not contribute information to the velocity measurement. The returning beam 25, as noted above, is separated by detector beam splitter 30 into two components: viz. the S component which is directed to detector 36, and the P component which is directed to detector 37. With reference to FIG. 6, the resulting electrical output signal on conductors 38, 39 which are the electrical analogs of the S and P polarization components, respectively, of the back reflected light are then coupled to the differential inputs of a conventional electrical subtracting circuit 70, the output of which is coupled to the input of a first logarithmic amplifier 72. Conductor 39 is also coupled to the input of a second logarithmic amplifier 74. The outputs of the logarithmic amplifiers 72, 74 are coupled to the differential inputs of a second electrical subtracting circuit 77. The output of circuit 77 is coupled to the input of zero crossing detector 78 which generates a pulse for each zero crossing of the analog input signal in the positive direction. The output of zero crossing detector 78 is coupled to the input of a counter 79 which counts the number of pulses in a given burst of received radiation, which count represents the differential doppler frequency. The output of counter 79 is coupled to a conventional display circuit 80, which may comprise a multicharacter digital light emitting diode array or the like.

As noted above, the output signal from S polarization detector 36 comprises an electrical signal which is the analog equivalent of the S light component of the back reflected beam 25, while the output of the P polarization detector 37 comprises the electrical analog to the P polarization component of beam 25. The S signal component, which has a waveform suggested by waveform 90 contains the differential doppler frequency information superimposed on a pedestal term, which can be represented by the following equation:

$$I_s = [1 + m \cdot \cos(2\pi f_d t)] p(t)$$

where $I_s$ is the S polarization intensity, $m$ is the modulation fraction, $fd$ is the doppler frequency and $p(t)$ is the pedestal term.

The P term suggested by waveform 91 contains only the pedestal term which can be represented by the following equation:

$$I_p = k \cdot p(t), \; k \text{ a constant}$$

By adjusting the relative gains of the two detectors 36, 37 in a conventional fashion, the pedestal terms $p(t)$ can be equalized. When waveform 91 is subtracted from waveform 90 in circuit 70, the resulting signal suggested by waveform 92 comprises a 100% doppler frequency modulated pedestal term. When this signal is divided by the pedestal term $p(t)$ by logarithmic amplifiers 72, 74 and electrical subtraction circuit 77, the resulting signal suggested by waveform 93 is the pure doppler frequency given by the following equation:

$$\log [m \cdot \cos (2\pi f_d t)] = \log(m) + \log [\cos(2\pi f_d t)]$$

Since this signal contains only the doppler frequency information, the relatively simple frequency counter and display circuit comprising elements 78-80 may be employed to yield the desired information.

A significant aspect of the invention is the redundancy of the measuring beam pairs when four lasers are employed. The laser input beams entering Amici prisms 41 and 43 produce redundant measurements of one velocity component, while beams entering Amici prisms 42 and 44 produce redundant measurements of the second velocity component. Thus, if focusing lens 23 becomes contaminated in a region thru which one beam of a given pair passes, e.g. by dirt, bug spots, or the like, the redundant beam pair, consisting of two beams which pass through the other regions of lens 23, is still available to provide an accurate measurement of the same velocity component.

As will now be apparent, the invention provides a number of distinct advantages over known devices. The invention, for example, can be fabricated from two sets of identical optical elements of relatively simple configuration. Further, due to the fact that the invention may be adjusted to provide exact path length equality for each beam pair, pulsed laser sources having very short coherence lengths, i.e. lengths on the order of microns, may be employed with the invention. In addition, emergent beam adjustment is relatively simple to perform. Moreover, due to the spacing of the emergent beams off the optical axis of the complete device, the beam compression lens assembly 26, detector beam splitter 30 and detector lenses 34, 35 of the associated velocimeter may all be positioned within a single housing containing the device. Further the rigid construction of the invention, the components of which are cemented together after initial adjustment, renders devices constructed according to the teachings of the invention substantially insensitive to mechanical shocks and vibrations. When used in a laser velocimeter, in addition to the ordinary uses to which anemometers have been applied in measuring fluid flow, e.g. wind tunnels, water flowing in a conduit, and flame processes, such a velocimeter may also be employed in those applications requiring highly accurate velocity measurements of solid objects. Such a device may be used for example to measure the velocity of filaments extruded from a processing fixture or die in paper mills, wire drawing operations, and generally in any application which requires the accurate measurement of the velocity of an object or medium without physical contact with the medium, or which requires velocity measurement in a relatively inaccessible location to which the beam pairs can be focussed. In addition to use in the disclosed velocimeter, the invention may be employed in any application which requires the generation of at least one pair of mutually coherent radiation beams and which will benefit from the advantages afforded by the invention as noted above.

Although beam splitting coating 49 has been specifically disclosed as having the property of equally dividing the S polarization component of the incident light, it should be noted that this is not an absolute requirement for the proper operation of devices constructed according to the teachings of the invention. Although this mode is preferred, the invention envisions other fractional divisions of the S polariation component if deemed useful or desirable in any application of the invention.

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. A radiation beam splitter for use in generating a pair of mutually parallel coherent radiation beams from a coherent radiation input beam having orthogonal polarization components, said radiation beam splitter comprising:

a plurality of Amici prisms each having opposing end faces and intermediate roof faces extending therebetween, said roof faces of different ones of said plurality of Amici prisms being arranged in facing relation, one of said roof faces of each of said Amici prisms including beam splitting means for reflecting a preselected fractional portion of at least one of said orthogonal polarization components of said input beam and for transmitting the remaining fractional portion of said at least one of said orthogonal polarization components to the interior of the associated Amici prism; and a plurality of reflecting prisms each associated to a different one of said Amici prisms, each said reflecting prism having a radiation input face coupled to one of said end faces of the associated one of said Amici prisms, a radiation output face, and a reflecting surface having a relatively high coefficient of reflectivity, said reflecting prisms each being arranged so that radiation entering said input face from the associated one of said Amici prisms is totally internally reflected by said output face, reflected by said reflecting surface and emerges from said output face.

2. The combination of claim 1 wherein each said fractional portion is substantially one-half.

3. The combination of claim 1 wherein said beam splitting means comprises a polarization coating.

4. The combination of claim 3 wherein said polarization coating is located adjacent one of said end faces and said associated reflecting prism is coupled to the remaining end face thereof.

5. The combination of claim 3 wherein said polarization coating is located adjacent one of said end faces and said associated reflecting prism is coupled to said one of said end faces.

6. The combination of claim 1 wherein said beam splitting means comprises means for reflecting a preselected fractional portion of one of said orthogonal polarization components of said input beam and for transmitting the remaining fractional portion of said one of said orthogonal polarization components and substantially all of the other one of said orthogonal polarization components to the interior of the associated Amici prism.

* * * * *